May 4, 1948.  M. H. SHERRIN  2,441,037
BATHROOM SCALE SUPPORT
Filed Nov. 17, 1944
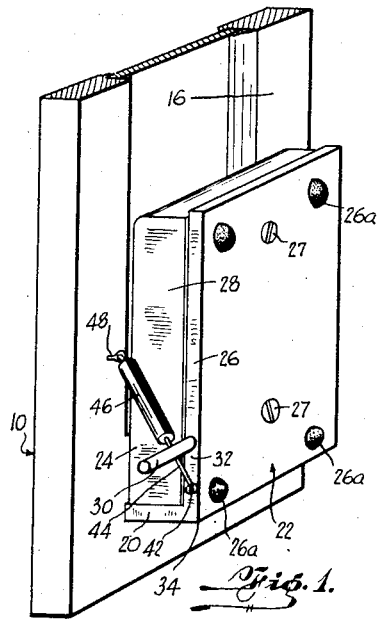
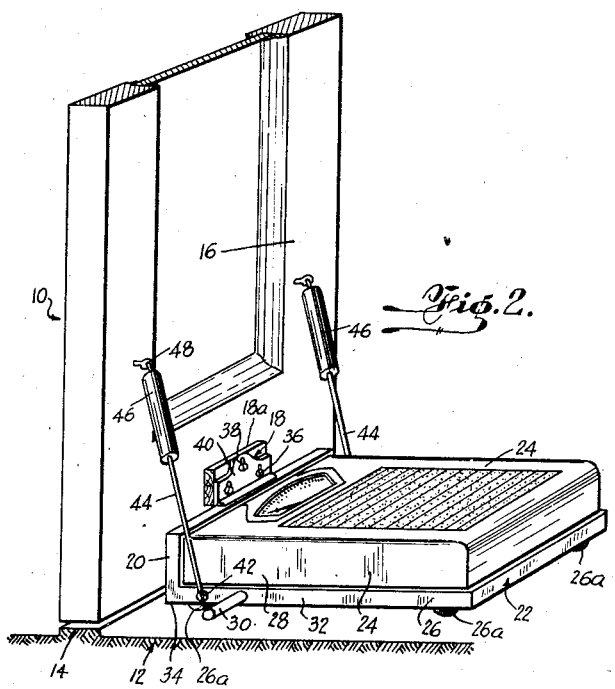
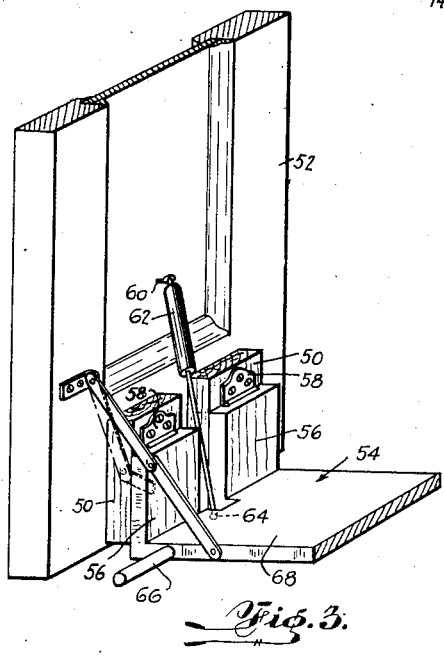
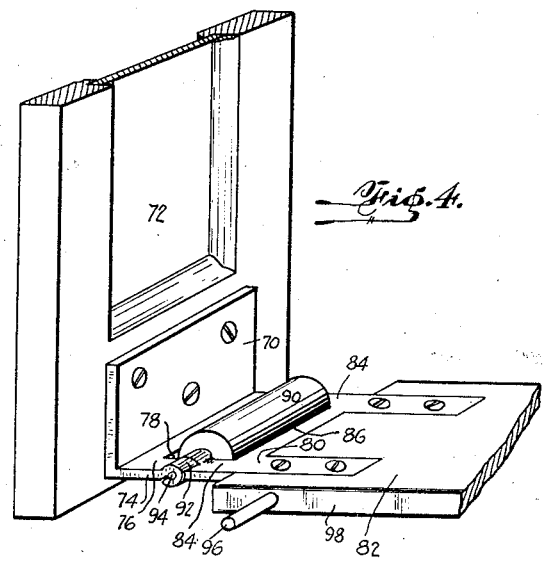
INVENTOR
MAX H. SHERRIN.
ATTORNEY Patented May 4, 1948

2,441,037

UNITED STATES PATENT OFFICE 2,441,037

BATHROOM SCALE SUPPORT

Max H. Sherrin, New York, N. Y.

Application November 17, 1944, Serial No. 563,956

2 Claims. (Cl. 248—284)

This invention relates to a support.

Particular reference will be made herein to the use of the invention in connection with a scale, such as ordinary, well-known types of bathroom scales, and the manner of supporting such scales so that the individual scale may be positioned for use instantly, and yet moves automatically, when no longer required for its weighing function, into position to remove it completely from the bathroom floor and to a position where it cannot interfere with the use of the bathroom. It is clear that the invention may have application in other connections.

It is an object of the invention to provide a support which will dispose a bathroom scale for use quickly whenever it is desired, where such scale will be carried upon a wall or a part of the bathroom such as the door, so that it may move out of a position where it is extended, upon the floor, and be retained "folded" against the door, leaving the bathroom free for other use.

It is an object of the invention to provide apparatus of the type indicated, in which the bathroom scale is held snugly against the door or wall, but, by slight application of force, as, for instance, by the foot of the person who desires to be weighed, is moved to firm support on the bathroom floor for the operation of weighing, and immediately upon completion of that weighing operation, moves automatically back to the initial completely collapsed relationship.

It is an object of the invention to provide apparatus of the type indicated in which the supporting means are so constructed that movement of the scale will be governed to protect it against breakage or shock.

Other objects and advantages will become apparent in the following detailed description, taken in connection with the drawing, illustrative of practical embodiments of the invention, and in which Fig. 1 is a perspective view, showing a portion of a door having apparatus embodying the invention associated therewith, the apparatus being shown in completely collapsed position, the door being broken away in section.

Fig. 2 is a view, similar to Fig. 1, showing the apparatus moved to bring the scale into position for performance of its weighing operation.

Fig. 3 is a view, similar to Fig. 2, showing a modified construction for the scale supporting apparatus.

Fig. 4 is a view, similar to Fig. 2, of a further modification of the scale-supporting apparatus.

In Figs. 1 and 2, a door 10 is shown to swing with relation to a floor 12 and into position with relation to a saddle 14. The door, in the usual manner, may move away from saddle 14, and towards a wall (not shown), or other structure of a building, or of a bathroom in such building. Carried upon a face 16 of door 10 is a spring hinge 18, one leaf of which is secured to a leg 20 of an L-shaped platform 22. A scale 24, secured to leg 26 of platform 22 by means such as screws 27, is of a height on face 28 equal to or just slightly less than the length of leg 20. Thus, when the platform is in the position shown in Fig. 1, and scale 24 is maintained in an upright position, the scale just barely touches or is spaced slightly away from face 16.

The springs associated with hinge 18 tend normally to move platform 22 and scale 24 into the position shown in Fig. 1. When it is desired to use the scale, a person approaches the door, places his foot upon a pin 30 positioned in edge 32 of platform 22 in any suitable manner. In the instance shown, pin 30 is secured near corner 34. When the platform is in the raised position of Fig. 1, pin 30 is at a distance from hinge 18 sufficient to provide the necessary lever arm effectively to turn platform 22 about hinge 18, in order to lower platform and scale to the position of Fig. 2. The hinge pintle axis is at a proper level, and leg 20 is of a length sufficient, to bring resilient feet 26a substantially into contact with floor 12. In order that platform 22 should not remain suspended free of contact with the floor in the event there are slight variations in dimensions arising from shrinkages, warping and the like, openings 38 in leaf 40 of hinge 18, through which screws 36 are engaged to secure hinge 18 to the door 10 may be slightly larger than necessary for screws 36; thus, a limited amount of vertical movement of hinge 18 on the screws is permitted to assure that feet 26a move into contact with floor 12.

Spaced from hinge 18 are pivot members 42, to which are secured the ends of rods 44 which are a part of dash pots 46. Dash pots 46 are anchored to door 10 at 48 by suitable means so that the dash pots may have limited arcuate movement. Thus, as the springs of hinges 18 function to return platform 22 to the position shown in Fig. 1, dash pots 46 will prevent any tendency to slam scale 24 against the door. The springs, mentioned as a part of hinge 18, may instead be associated with dash pots 46 in a manner well known in the art.

In the modification shown in Fig. 3, a pair of blocks 50 may be secured to a door 52. Platform 54 is formed with a pair of legs 56, each of which is secured to a block 50, by an individual hinge 58 which may be of the spring type. Extending between blocks 50 is a pin 60 which provides pivoting support for a dash pot 62 which in turn is secured to a pin 64 between legs 56. A pin 66 extending beyond edge 68 of platform 54 provides necessary leverage to move the platform into position for the weighing operation against the action of the springs.

In the modification shown in Fig. 4, a bracket 70 is secured to a door 72. The bracket is L-shaped, one leg 74 having a pair of arms 76 between which is a gap 78. A plate 80 secured to a platform 82 has a pair of arms 84 which, between them, provide a gap 86. Arms 76 and 84 and gaps 78 and 86 associate to form a recess into which may be fitted a combined spring and dash-pot-retaining member 90. Arms 76 and 84 are formed with interlocking ears 92 to form a hinge. Pins 94 extending from member 90 seat within ears 92 for imparting the necessary driving and damping action to platform 82. A pin 96 may extend from edge 98 of platform 82 to provide the necessary actuating means. Platform 82 is of a desired thickness, and leg 74 is spaced from the bottom of door 72, so that the platform will rest upon the floor in lowered position. The length of leg 74 provides the extent necessary for housing a scale (not shown) between door 72 and platform 82.

Many modifications and adaptations of the forms of the device illustrated in the accompanying drawings and described in the foregoing may be provided without departing from the spirit and scope of the invention, and, therefore, all such modifications and adaptations are considered to fall within the scope of the appended claims.

Having thus described my invention, what I claim as new and desire to secure by Letters Patent is:

1. Means for supporting a weighing scale selectively in either horizontal or vertical position upon a swinging door, said means comprising, a bracket fixed to and having a leg thereof extending laterally from the door, a platform, the extending leg and the platform having complementary recesses at juxtaposed ends, means for hingedly supporting the platform upon the extending leg to support the platform for movement into juxtaposition with the door or a floor, the platform providing means for supporting a weighing scale and retaining the scale in position for supporting a person when the platform is in juxtaposition with the floor, means in the complementary recesses for moving the platform normally towards the door, and means extending from the platform to move the platform towards the floor for bringing the scale into position to support the person.

2. A platform for pivotal attachment to a swinging door, comprising a substantially L-shaped member, spring hinging means between one leg of the L and the door to support the platform for movement selectively into juxtaposition with the door or a floor, the other leg of the L providing means for supporting a weighing scale and for retaining the scale in position for supporting a person when the platform is in juxtaposition with the floor, the spring hinging means moving the platform normally towards the door to bring the scale against the door, means for damping the movement of the platform as it moves under the action of the spring hinging means, and means extending from the scale-supporting leg to move the platform towards the floor for bringing the scale into position to support the person.

MAX H. SHERRIN.

REFERENCES CITED

The following references are of record in the file of this patent:

UNITED STATES PATENTS

| Number | Name | Date |
|---|---|---|
| 519,410 | Moore | May 8, 1894 |
| 575,721 | Lind | Jan. 26, 1897 |
| 1,165,112 | Mott | Dec. 21, 1915 |
| 1,329,546 | Rhoades | Feb. 3, 1920 |
| 1,485,714 | Roach | Mar. 4, 1924 |
| 1,655,721 | Agee | Jan. 10, 1928 |
| 1,880,621 | Willetts | Oct. 4, 1932 |